(12) United States Patent
Perincherry et al.

(10) Patent No.: US 11,270,481 B2
(45) Date of Patent: *Mar. 8, 2022

(54) APPARATUS AND METHODS FOR GENERATING DATA STRUCTURES TO REPRESENT AND COMPRESS DATA PROFILES

(71) Applicant: INDIGGO LLC, Bethesda, MD (US)

(72) Inventors: Vijay Perincherry, Potomac, MD (US); Janine Gelbart, Bethesda, MD (US); Marc Inzelstein, Rockville, MD (US)

(73) Assignee: Indiggo LLC, Bethesda, MD (US)

( * ) Notice: Subject to any disclaimer, the term of this patent is extended or adjusted under 35 U.S.C. 154(b) by 372 days.

This patent is subject to a terminal disclaimer.

(21) Appl. No.: 16/281,843

(22) Filed: Feb. 21, 2019

(65) Prior Publication Data

US 2019/0251718 A1    Aug. 15, 2019

Related U.S. Application Data

(63) Continuation of application No. 15/092,349, filed on Apr. 6, 2016, now Pat. No. 10,255,700.

(51) Int. Cl.
*G06F 16/907* (2019.01)
*G06T 11/20* (2006.01)
(Continued)

(52) U.S. Cl.
CPC .......... *G06T 11/206* (2013.01); *G06F 3/0481* (2013.01); *G06F 3/0484* (2013.01);
(Continued)

(58) Field of Classification Search
CPC .......... G06F 17/30153; G06F 17/3053; G06F 3/0481; G06F 3/0484; G06F 17/30035; G06F 17/30997

See application file for complete search history.

(56) References Cited

U.S. PATENT DOCUMENTS 5,197,116 A    3/1993 Katoh et al.
8,200,527 B1    6/2012 Thompson et al.
(Continued)

FOREIGN PATENT DOCUMENTS

WO    WO 2014/040175 A1    3/2014

OTHER PUBLICATIONS

Extended European Search Report dated Aug. 16, 2017, in European Application No. 17165375.1 filed on Apr. 6, 2016, 6 pages.
(Continued)

*Primary Examiner* — Truong V Vo
(74) *Attorney, Agent, or Firm* — Cooley LLP

(57) ABSTRACT

Embodiments described herein relate generally to apparatuses and methods for structuring and processing data. In some embodiments, a method includes receiving stimulus-response data, via a processor, the stimulus-response data including a digital representation of a stimulus and a digital representation of a response. The processor calculates a weight associated with the stimulus-response data, based on a rule, and identifies: (1) a distribution type, based on the digital representation of the stimulus; and (2) a range of inclination values of the distribution type, based on the digital representation of the response. The processor compiles a compressed multidimensional data profile associated with an object of the stimulus-response data and based on the weight, the digital representation of the distribution type, and the digital representation of the range of inclination values.

20 Claims, 9 Drawing Sheets

(51) Int. Cl.
*G06F 16/174* (2019.01)
*G06F 16/2457* (2019.01)
*G06F 16/435* (2019.01)
*G06F 3/0481* (2022.01)
*G06F 3/0484* (2022.01)

(52) U.S. Cl.
CPC .... *G06F 16/1744* (2019.01); *G06F 16/24578* (2019.01); *G06F 16/437* (2019.01); *G06F 16/907* (2019.01)

(56) References Cited

U.S. PATENT DOCUMENTS

| | | |
|---|---|---|
| 10,255,700 B2 | 4/2019 | Perincherry et al. |
| 10,373,074 B2 | 8/2019 | Perincherry et al. |
| 10,671,930 B2 | 6/2020 | Perincherry et al. |
| 10,719,784 B2 | 7/2020 | Perincherry et al. |
| 2006/0004680 A1 | 1/2006 | Robarts et al. |
| 2009/0149246 A1 | 6/2009 | Opaluch |
| 2011/0307328 A1 | 12/2011 | Crites et al. |
| 2012/0246302 A1 | 9/2012 | Lafleur et al. |
| 2012/0265811 A1 | 10/2012 | Bist |
| 2013/0262483 A1 | 10/2013 | Blom et al. |
| 2013/0266918 A1* | 10/2013 | Tinjust ............... G09B 19/0038 434/247 |
| 2014/0135593 A1 | 5/2014 | Jayalth et al. |
| 2015/0032511 A1 | 1/2015 | Haddad et al. |
| 2017/0293855 A1 | 10/2017 | Perincherry et al. |
| 2017/0294037 A1 | 10/2017 | Perincherry et al. |
| 2017/0316322 A1 | 11/2017 | Perincherry et al. |
| 2019/0392346 A1 | 12/2019 | Perincherry et al. |
| 2020/0302341 A1 | 9/2020 | Perincherry et al. |

OTHER PUBLICATIONS

Extended European Search Report for EP Patent Application 17165376.9 dated Aug. 17, 2017.

* cited by examiner

APPARATUS AND METHODS FOR
GENERATING DATA STRUCTURES TO
REPRESENT AND COMPRESS DATA
PROFILES

CROSS-REFERENCE TO RELATED
APPLICATIONS

This application is a Continuation of U.S. patent application Ser. No. 15/092,349, filed on Apr. 6, 2016 and titled "Apparatus and Methods for Generating Data Structure to Represent and Compress Data Profiles," the entire contents of which are hereby incorporated by reference.

This application is related to co-pending U.S. patent application Ser. No. 15/092,351, filed on Apr. 6, 2016 and titled "Adaptive Systems, Apparatus and Methods for Correlating Compressed Multidimensional Data Profiles to Engagement Rules," the entire contents of which are hereby incorporated by reference.

COPYRIGHT NOTICE

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

One or more embodiments described herein relate generally to apparatuses and methods for the representation and compression of data using data structures, and more particularly, to the representation and processing of profile data.

BACKGROUND

Personality profiles of individuals, or "individual mindsets," have traditionally been described in qualitative terms, rather than in quantitative terms. Qualitative descriptions, however, cannot quantify the information upon which they are based, nor can they quantify the levels of uncertainty associated with such information.

SUMMARY

Embodiments described herein relate generally to apparatuses and methods for structuring and processing data, for example individual mindset data in the context of leadership development. In some embodiments, a method includes receiving stimulus-response data, at a processor, from an individual (or "user"). The stimulus-response data includes a digital representation of a stimulus and a digital representation of a response received from the individual (e.g., via a user interface) in response to the stimulus. The processor calculates a weight associated with the stimulus-response data based on a rule, and identifies: (1) a distribution type, or "mindset dimension," based on the digital representation of the stimulus; and (2) a range of inclination values, or "leanings," of the distribution type, based on the digital representation of the response. The processor then compiles a compressed multidimensional data profile, or "mindset profile," associated with an object of the stimulus-response data (i.e., the individual) based on the weight, the digital representation of the distribution type, and the digital representation of the range of inclination values.

DETAILED DESCRIPTION

Some embodiments described herein relate generally to representing information about individual mindsets in a compressed, multidimensional digital format that can be shared among entities and that can be dynamically modified in response to additional information. Methods presented herein generate digital representations of compressed multidimensional data profiles, or "mindset profiles," that quantify not only information about an individual's mindset, but also the strength of evidence upon which the information is based, as well as the level of uncertainty associated with the mindset information. Methods described herein also allow for the processing and integration of additional evidence to modify compressed multidimensional data profiles in a consistent manner.

Figure 1:
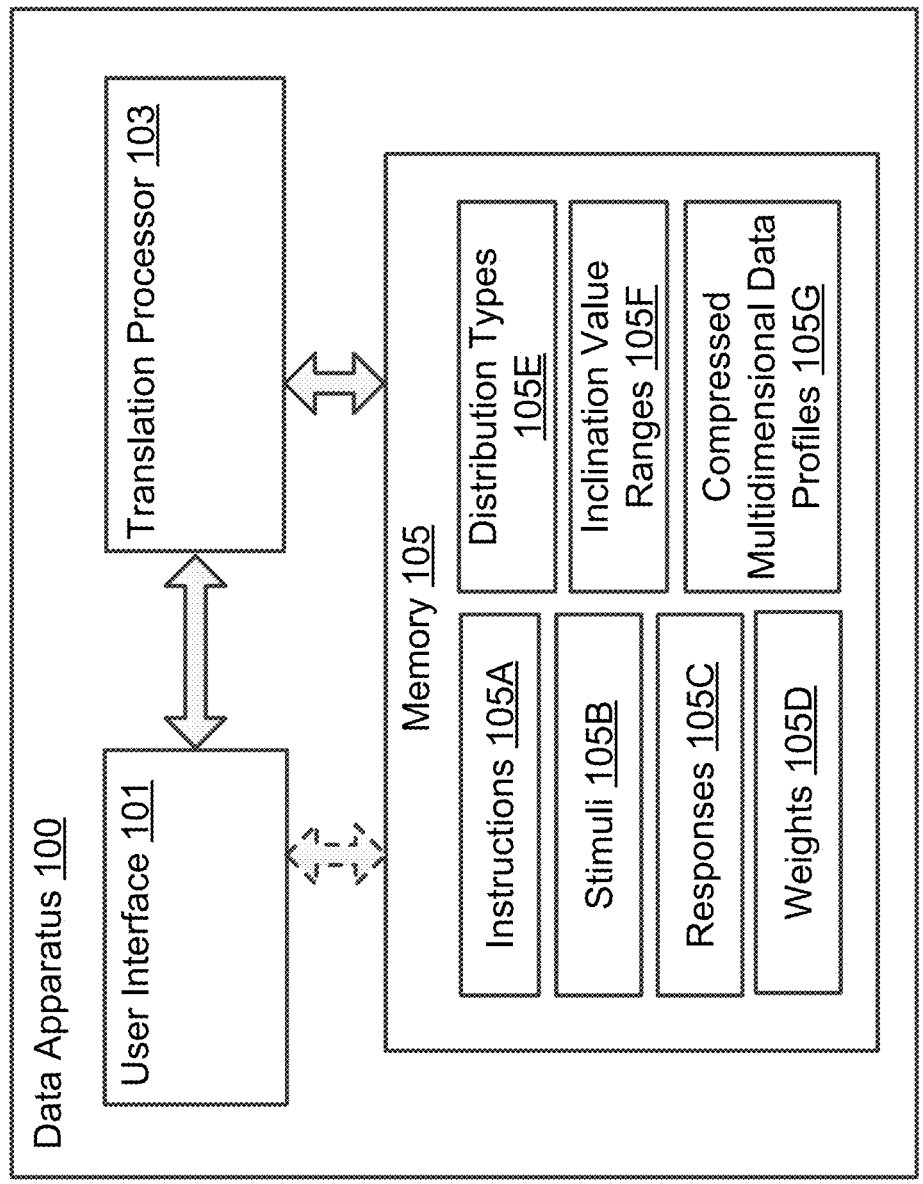
FIG. 1 illustrates a system block diagram of a data compression apparatus, according to an embodiment.

FIG. 1 illustrates a system block diagram of a data compression apparatus, according to an embodiment. As shown in FIG. 1, the data compression apparatus 100 includes a user interface 101 operably coupled to a translation processor 103. The user interface 101 is configured to display a set of stimuli to an individual and to receive from the user a set of responses associated with the set of stimuli. The user interface 101 can be implemented as or can include one or more of a software application ("app"), a graphical user interface (GUI), and an input device such as a touchscreen, keyboard, mouse, keypad, etc. The user interface 101 can run on and/or be accessible via a user device (not shown) such as a desktop or laptop computer, or a mobile device such as a Blackberry or an iPhone. The translation processor 103 can be implemented using a microprocessor, an application-specific integrated circuit (ASIC), a central processing unit (CPU), a general purpose processor, etc. The translation processor 103 can be configured to perform operations on data received from an individual via the user interface 101. The translation processor 103 can also be configured to collect data from the user device, for example by communicating with one or more software applications running on the user device (e.g., an email/calendar software such as Microsoft Outlook®, web conferencing software such as Cisco WebEx®, etc.). The translation processor 103 and, optionally, the user interface 101, are operably coupled to a memory 105, which may include a random access memory (RAM), a read only memory (ROM) device, a magnetic and/or optical recording medium and its corresponding drive, and/or another type of static and/or dynamic storage device that may store information and instructions for execution by translation processor 103. Memory 105 can stores processor-issuable instructions 105A as well as data including stimuli 105B, responses 105C, weights 105D, distribution types 105E, inclination value ranges 105F, and compressed multidimensional data profiles 105G, for example in one or more databases. The processor-issuable instructions (or processor-readable instructions) can be stored in memory 105 and can cause the translation processor 103 to perform processes described herein.

Stimuli 105B can include data that can be presented or displayed to an individual via the user interface to generate or trigger an action or response from the individual, for example, a survey-type question, interactive form or graphic, prompt, pop-up window, calendar reminder, email, meeting request, hyperlink, news article, and/or the like. Responses 105C can include data that is received via the user interface 101 in response to one or more of the stimuli 105B, for example within a predetermined time period after the one or more stimuli 105B are presented/displayed via the user interface 101. Response data 105C can include data input by a user/individual action via the user interface 101 (e.g., typed text, voice-communicated text, touchscreen input data such as swipes, mouse clicks, etc.), for example where such user/individual actions include answers to questions, minimizing or closing a pop-up window, accepting or declining a meeting request, etc. In other words, the response data 105C can be any type of response by the user/individual via the user interface 101 in response to stimuli 105B. Response data 105C can also include an indication of the time elapsed between the associated stimulus 105B and the response 105C, and/or a manner of input of the response 105C (typed text, voice-communicated text, touchscreen input data such as swipes, mouse clicks, etc.). Each of the responses 105C can be paired with (or linked or associated with) an associated stimulus 105B and, optionally, stored in the memory 105 as a stimulus-response pair. Translation processor 103 can calculate (or determine) a weight 105D having a value (e.g., a value between 0 and 1) for each stimulus-response pair, assign that weight to a stimulus-response pair, and used that weight in the computation of one or more of the compressed multidimensional data profiles 105G. Weights 105D can be stored within stored memory 105.

As used herein, a compressed multidimensional data profile 105G, or "mindset profile," is a vector representation of an individual's preferences or "leanings" (or behavioral leanings) (also referred to herein as inclination value ranges 105F) associated with each of a set of attitudinal factors or "mindset dimensions" of interest (also referred to herein as distribution types 105E). The compressed multidimensional data profile 105G is generated through a series of interactions of the individual with the user interface 101, and can be based in part on the relative importance that the individual assigns for each distribution type 105E. For example, the relative importance assigned to a particular distribution type 105E can be based on (e.g., proportional to) the number of interactions by the user in building up or used as input to form a behavioral leaning (inclination value range 105F). The set or collection of distribution types 105E used to generate a compressed multidimensional data profile 105G can be case-specific or customized to the individual. For example, when performed as part of a leadership development program, generating a compressed multidimensional data profile 105G may include the pre-selection (e.g., by a user/individual) and analysis of the following distribution types 105E, described in Table 1 below:

Action orientation
Openness
Verification style
Judgment style
Self-awareness

TABLE 1

Table of Examples of Distribution 105E Types and Associated Leaning Labels

| Distribution Type | Description | Learning Labels for extremes of the range |
|---|---|---|
| Action orientation | Predisposition to take action | Passive-Active |
| Openness | Willing to accept different ideas and opinions | Skeptical-Accepting |
| Verification | Approach to verifying and validating | Personal experience-Recommendations |
| Judgment style | Style of making judgments about persons or things | Slow to judge-Quick to judge |
| Self-awareness | Awareness of one's own strengths and weaknesses | Very unaware-Very aware |

For each distribution type 105E, an individual can be represented by an inclination value range 105F, which is a numerical distribution whose endpoints (i.e., maximum and minimum values) are defined, for example, by the "leaning labels" set forth in Table 1 above. For example, the "Passive—Active" range associated with the distribution type 105E of "action orientation" can span a numerical range of 1 to 10, where 1 corresponds to "passive" and 10 corresponds to "active."

A compressed multidimensional data profile 105G can include a set of inclination value ranges 105F, and is generated using "evidence" drawn from behaviors of individuals. As used herein, "evidence" is a behavioral choice or action of an individual where that behavioral choice or action has been translated into a stimulus-response signal (i.e., a pairing of one or more stimuli 105B of FIG. 1 with one or more associated responses 105C) and mapped to a distribution type (e.g., distribution types 105E in FIG. 1), for example, based on a predefined set of rules. For example, if an individual responds to a question (or "stimulus") regarding whether he/she had considered a leadership development program in the past with a response of "yes," the question-answer pair (or stimulus-response pair) is translated into a positive stimulus-response signal that is mapped to a distribution type of "desire to improve" (also referred to as "openness" as shown in Table 1). Evidence can be based on the occurrence of any action taken by an individual, whether such an action is taken in response to an explicit stimulus or not (e.g., scheduling a meeting without being prompted, providing feedback to an employee without being prompted, etc.). Through engagement of the individual with the apparatus 100, a set of stimulus-response signals is generated, and each stimulus-response signal of the set of stimulus-response signals is mapped to one or more associated inclination values 105F of one or more compressed multidimensional data profiles 105G as described above.

Figure 2:
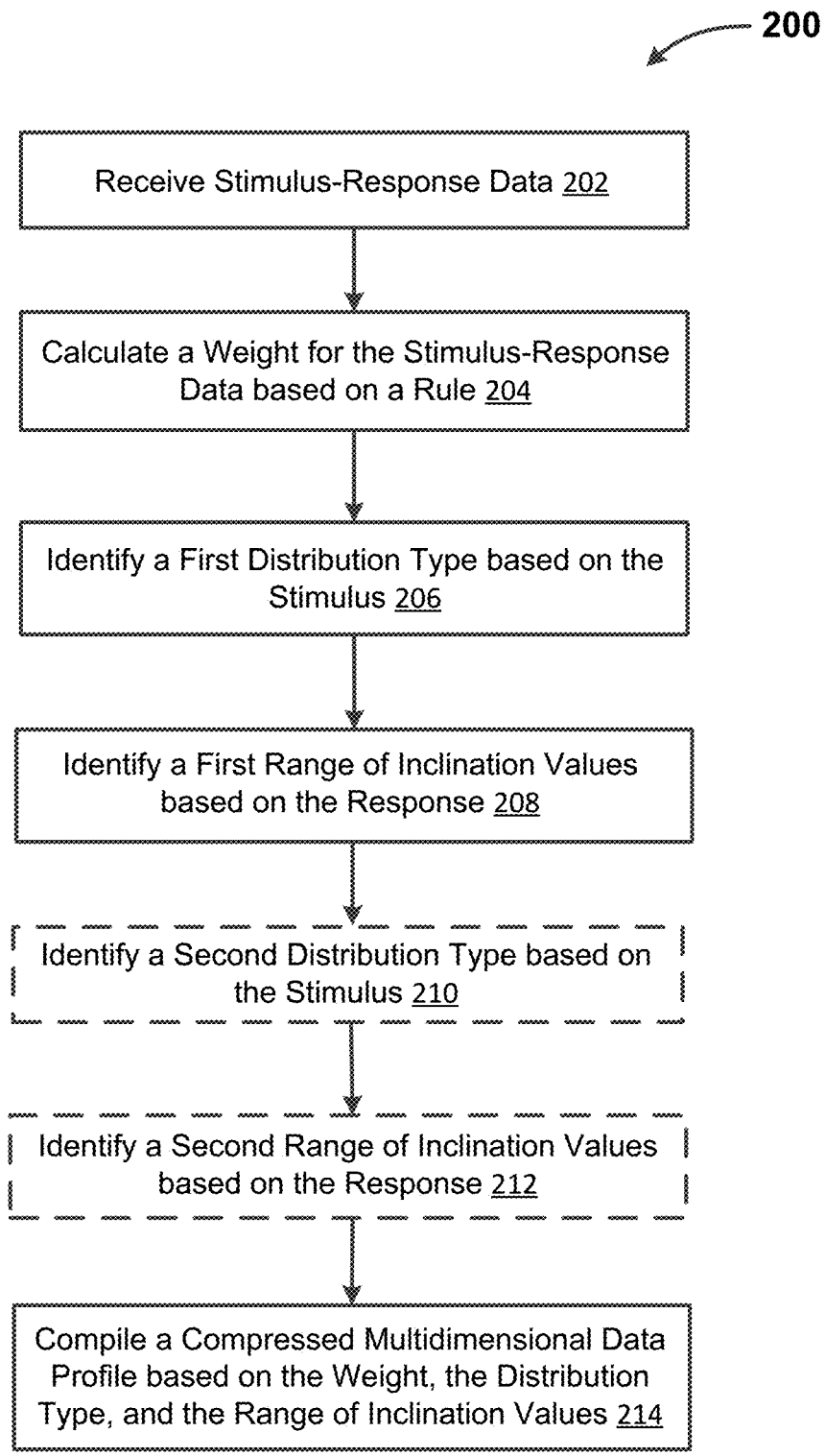
FIG. 2 is a flow diagram illustrating a method for data compression, according to an embodiment.

FIG. 2 is a flow diagram illustrating a method for data compression, compatible with the data compression apparatus 100 of FIG. 1, according to an embodiment. As shown in FIG. 2, a method 200 includes receiving, at a processor (such as translation processor 103 of FIG. 1, for example via a user interface 101), stimulus-response data (or "evidence") associated with an individual at 202 and including a digital representation of a stimulus and a digital representation of a response associated with the stimulus. The processor calculates a weight associated with the stimulus-response data, based on a rule (or set of rules), at 204. The rule can be based on a credibility of the stimulus-response data, a credibility of a source of the stimulus-response data, and/or a level of uncertainty inherent in a pre-existing multidimensional profile for the individual. The credibility of the stimulus-response data or the credibility of the source of the stimulus-response data can be determined by the user/individual associated with the stimulus-response data. For example, stimulus-response data based on hearsay can have a lower credibility (and an associated lower weight) than stimulus-response data based on observations. The weight assigned to stimulus-response data can be based on an analytical/formulaic assessment of the credibility, based on a subjective assignment by the user/individual or based on a combination. For example, credibility of stimulus-response data initially can be subjectively assigned by a user/individual (and then an associated weight subsequently assigned), and later then subjective assignment of credibility by the user/individual can be calculated (or determined) by an analytical/formulaic assessment of the credibility (and associated weight).

At 206, the processor identifies and/or retrieves from memory a first distribution type based on and/or associated with the stimulus. The processor then identifies and/or retrieves from memory a first range of inclination values based on the digital representation of the response, at 208. Based on the weight, the first distribution type, and the first range of inclination values, the processor assembles or compiles a compressed multidimensional data profile at 214. In some embodiments, prior to the processor compiling a compressed multidimensional data profile at 214, the processor identifies a second distribution type based on and/or associated with the digital representation of the stimulus, at 210, and identifies a second range of inclination values based on the response, at 212. In other words, a single stimulus can have more than one distribution type associated with it. In such cases, the processor then compiles a compressed multidimensional data profile at 214 based on the weight, the first distribution type, the second distribution type, the first range of inclination values, and the second range of inclination values.

In some embodiments, the stimulus-response data received at the processor during method 200 is a first stimulus-response data, and the method 200 further includes receiving a second stimulus-response data including a digital representation of a second stimulus and a digital representation of a second response. In such cases, the processor can modify the compressed multidimensional data profile based on the second stimulus-response data.

In some embodiments, the processor is configured to present a series of stimuli to an individual via the user interface, and to receive a series responses via the user interface in response to the series of stimuli, thereby generating a relatively large number of stimulus-response pair data. The processor can then: (1) calculate a set of weights, each weight of the set of weights being uniquely associated with a stimulus-response pair from the series of stimulus-response pairs; (2) retrieve one or more distribution types (e.g., from memory), each associated (in some implementations, uniquely) with a stimulus from the series of stimuli; (3) retrieve one or more ranges of inclination values, each associated (in some implementations, uniquely) with a response from the series of responses and its associated distribution type; and (4) define a compressed multidimensional data profile based on the set of weights, the one or more distribution types, and the one or more ranges of inclination values.

An inclination value range, or "mindset leaning distribution," is a representation of an individual's attitudes or leanings for a given distribution type (i.e., along a given mindset dimension). Inclination value ranges are computed by aggregating weighted stimulus-response data into numerical values using pre-specified mappings, thereby transforming the stimulus-response data into a compressed form that can be efficiently processed. To transform stimulus-response data into inclination value ranges, each stimulus, or event/situation that the individual responded to, is mapped to one or more distribution types, and each response (or group of responses) to a particular stimulus is mapped to a range of inclination values along the one or more distribution types. In some embodiments, inclination value ranges are represented as normalized distributions over numerical ranges. Inclination value ranges can have distributions that are unimodal or multimodal. A method of generating an inclination value range, according to an embodiment, is shown in FIG. 3.

Figure 3:
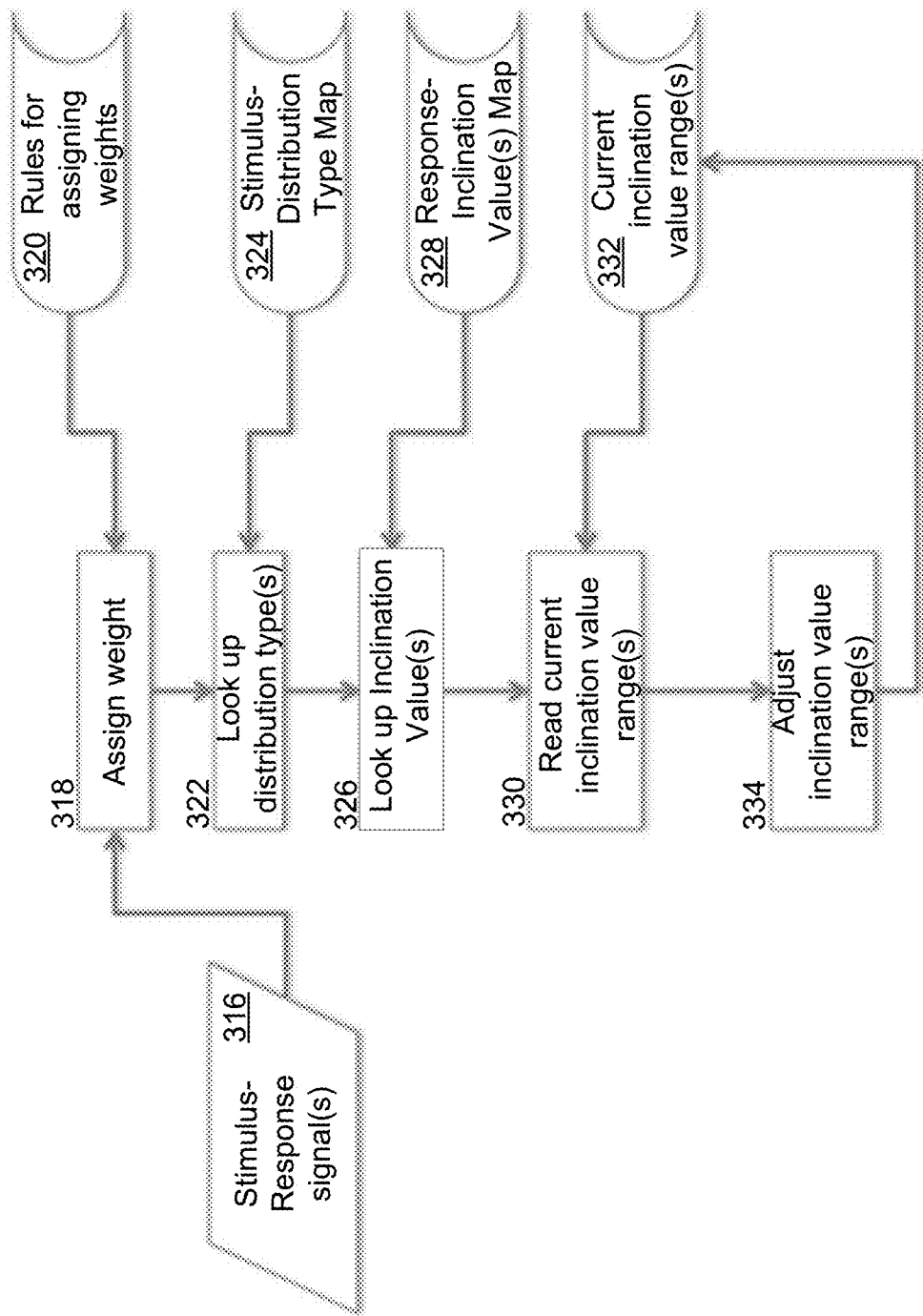
FIG. 3 is a flow diagram illustrating a method of inclination value range, or "mindset leaning" distribution, computation, according to an embodiment.

As shown in FIG. 3, one or more stimulus-response signals are received (e.g., at a processor and via a user interface), based on an action (or inaction) of an individual, at 316. Each stimulus-response signal is assigned a weight via a translation processor, at 318, based on one or more rules for assigning weights 320. The rules for assigning weights 320 can specify predetermined weights associated with a stimulus and/or a response of the stimulus-response signal. Alternatively or in addition, the rules for assigning weights 320 can assign or modify weights based on a source of the stimulus-response signal, a predetermined credibility of the source of the stimulus-response signal, or on a level of uncertainty of a current associated compressed multidimensional data profile and/or associated inclination value range. The translation processor looks up one or more distribution types (also referred to herein as "mindset dimensions") associated with a stimulus of the stimulus-response signal, at 322, by accessing a stimulus-distribution type map 324 stored in memory. The stimulus-distribution type map 324 (also referred to as a "stimulus-dimension map") can be implemented, for example, in a lookup table that links/maps a particular stimulus of (or stimulus value from) the stimulus-response signal to a particular distribution type ("mindset dimension"). The translation processor also looks up one or more inclination values associated with a response of the stimulus-response signal, at 326, by accessing a response-inclination value map 328 (e.g., stored in memory). The response-inclination value map 328 can also be implemented, for example, in a lookup table that links/maps a particular response of (or response value from) the stimulus-response signal to a particular inclination value (leaning value). One or more current inclination value ranges associated with the individual and with the stimulus-response signal is retrieved or "read," at 330, from a table of current inclination value ranges 332 stored in the memory. At 334, the translation processor adjusts the one or more inclination value ranges retrieved at 330, based on the weight assigned at 318, the distribution type(s) retrieved at 322, the inclination value(s) retrieved at 326, and the current inclination value range(s) retrieved at 330. The adjusted inclination value range(s) are then stored in the memory, for example by replacing what was previously the "current inclination value range(s)," or by adding the adjusted inclination value range(s) as a separate record in the memory. The adjusted inclination value range(s), optionally in combination with other previously stored inclination value range(s), can subsequently be used by the translation processor to generate an adjusted compressed multidimensional data profile.

Figure 4:
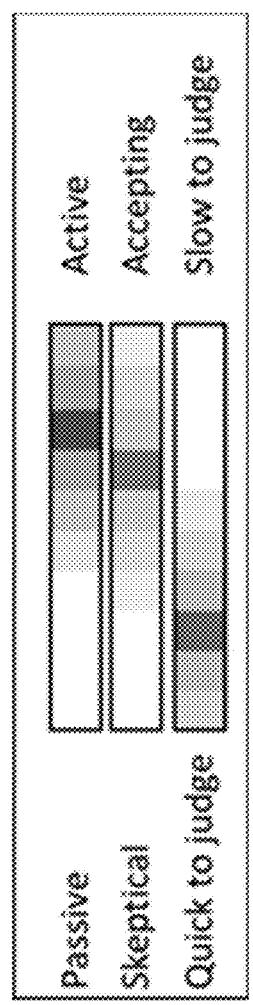
FIG. 4 illustrates a multidimensional data profile, or "mindset profile," according to an embodiment.

An individual's compressed multidimensional data profile includes a collection or consolidation of inclination value ranges along multiple distribution types. FIG. 4 is a graphical illustration of a compressed multidimensional data profile, according to an embodiment. As shown in FIG. 4, the compressed multidimensional data profile includes three inclination value ranges (or "leaning distributions")—one for each of three distribution types: action orientation (top), openness (middle), and judgment style (bottom). The individual represented by the compressed multidimensional data profile of FIG. 4 can generally be described as action-oriented, open to accepting new ideas, and quick to make judgments. Each of these attributes is quantified by the associated inclination value ranges along a numerical continuum, the inclination value ranges each including data that is normally distributed and centered about an inclination value that reflects the latest aggregation of processed stimulus-response data for the individual.

In some embodiments, a compressed multidimensional data profile is defined as:

$$M(I)=\{RI(DT1,I),RI(DT2,I),RI(DT3,I) \ldots RI(DTN,I)\},$$

where M=the compressed multidimensional data profile, I=an identifier of an individual, RI=a range of inclination values, and DT1 through DTN represent distribution types of a set of distribution types. For example, if there are four distribution types—desire to improve (DES), willingness to learn (WIL), judgment style (JUD), and learning style (LRN) and the range of inclination values for an individual I along compressed multidimensional data profile M is expressed by the notation RI(M,I), then the mindset profile of the individual I is represented as:

$$M(I)=\{RI(DES,I),RI(WIL,I),RI(JUD,I),RI(LRN,I)\}$$

As discussed above, the range of inclination values RI is defined as a continuous distribution along a numerical range.

When a new stimulus-response signal (or other evidence) that is mapped to one or more distribution types is received, the corresponding range of inclination values is modified according to the following function:

$$RI^1(X,I)=RI^0(X,I)(+)SD(X,I)$$

where:
  $RI^0(X,I)$ is the current leaning distribution;
  $RI^1(X,I)$ is the modified leaning distribution;
  SD (X,I) is the leaning distribution of the signal;
  X is a vector representing the range of values of a dimension (also referred to herein as a distribution type such as those shown in Table 1); and
  (+) is the notation for evidence aggregation.

Figure 5:
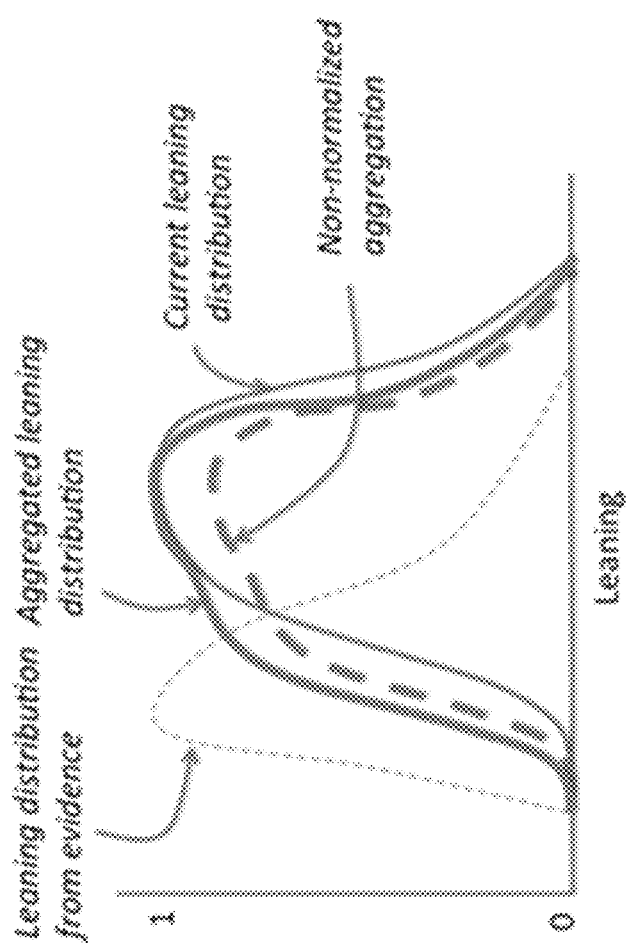
FIG. 5 is an example of a plot illustrating evidence aggregation.

As discussed above, stimulus-response signals (or other evidence) are mapped onto distribution types with specific associated inclination value ranges. Other evidence can be, for example, demographic information of the user/individual; a younger user/individual may be statistically more likely to be open minded and can be more likely mapped onto a distribution type such as "Openness" listed in Table 1. Any event in which an individual interacts with the systems described herein (e.g., via the user interface), or even the lack of such an event (e.g., an individual fails to schedule a meeting within a certain amount of time, an individual fails to provide a meeting summary within a certain amount of time, or an individual fails to follow up on an action item identified during a meeting within a certain amount of time), can be translated into a stimulus-response signal such that the stimulus can be mapped to one or more distribution types, and the response associated with the stimulus can be mapped to a range of one or more inclination values (i.e., a subset of all available inclination values). This translation of user events into inclination values for one or more distribution types may be referred to as "evidence aggregation." FIG. 5 is a plot illustrating evidence aggregation, according to an embodiment. With reference to FIG. 5, the "current leaning distribution" curve shows a starting distribution or inclination value range. This starting distribution or inclination value range can be a generic to all individuals or selected specifically for the given individual. The "leaning distribution from evidence" is a representation of an inclination value range that is based on evidence that has been received and translated. The "non-normalized aggregation" curve is an intermediate product representing the weighted aggregation of the "current leaning distribution" and the "leaning distribution from evidence." The "aggregated leaning distribution" curve is a normalized version of the "non-normalized aggregation" curve data. In other words, the "aggregated leaning distribution" curve is a modified version of the initial "current leaning distribution" after evidence (e.g., one or more stimulus-response pairs) has been received, processed/translated, and used to adjust what was previously the "current leaning distribution." For each curve shown in FIG. 5, the maximum value is set to 1 and all other values are scaled accordingly.

In some embodiments, an inclination value range is represented as a vector of two arrays. In other words, rather than representing or storing the inclination value range as a graph as shown in the example of FIG. 5, the inclination value range can be compressed and stored in a compressed form as a vector of two arrays. The first array has two values—weightage and interval, and the second array has values for each increment by interval between 1 and 10. A value greater exceeding 1 represents the number of zeroes following the previous increment. The precision of the data can be inversely proportional to the increment value chosen. In some embodiments, an inclination value range satisfies one or more of the following conditions:
  There should be two valid arrays
  Conditions for validating the first array:
    Array contains two non-negative values.
    The first value—weightage—is a non-negative, real number.
    The second value—increment—is a number that is greater than 0 such that 10 divided by the increment is an integer.
  Conditions for validating the second array:
    All values are non-negative.
    At least one element in the array has a value of 1.
    All values >1 are positive integers.
    (The number of values <=1)+(sum of values >1)=10÷increment.

Figure 6:
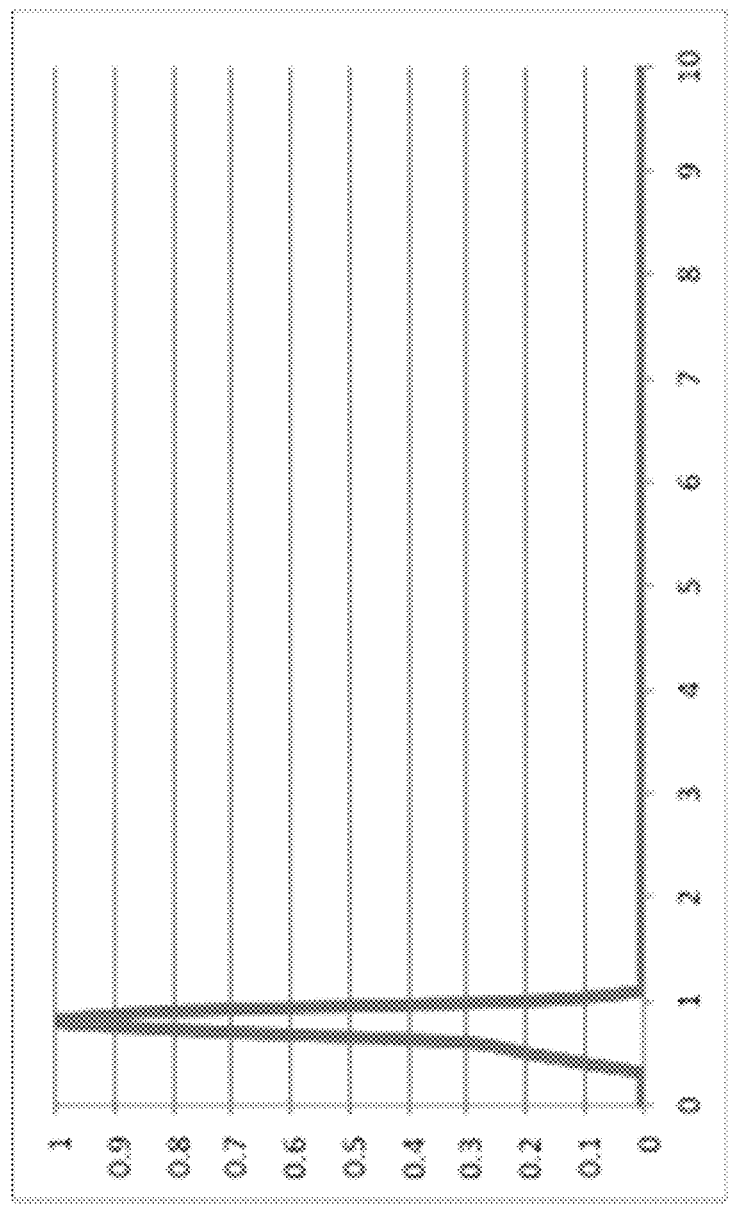
FIG. 6 is an example of a plot of an inclination value range, or "leaning distribution."
Figure 7:
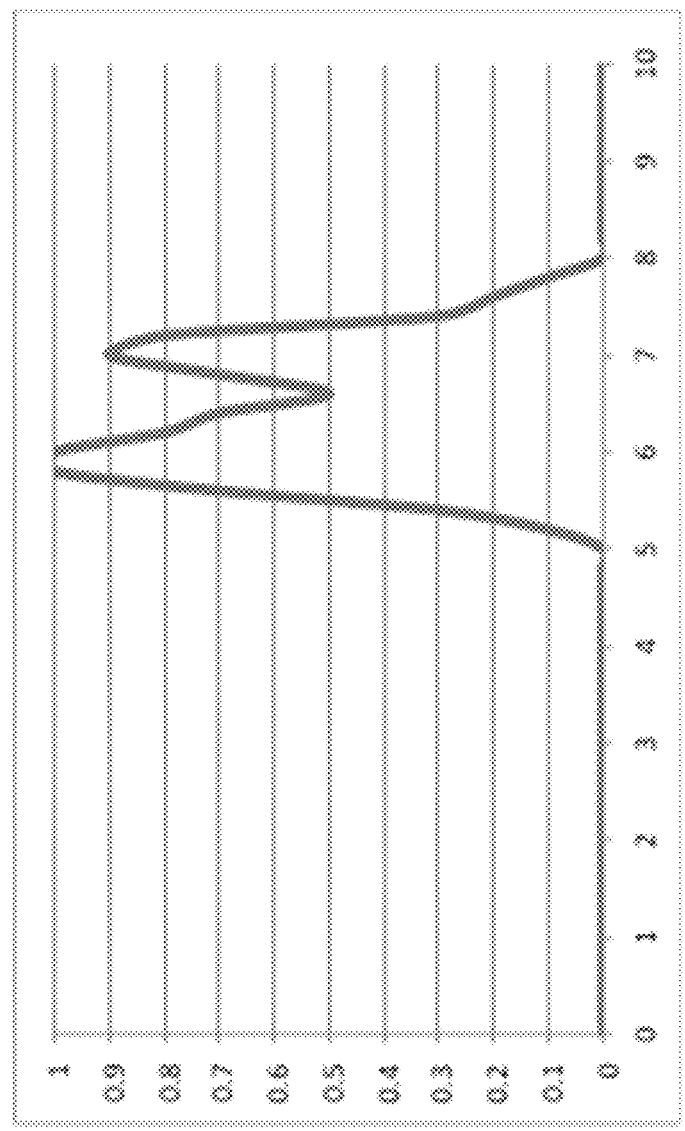
FIG. 7 is an example of a plot of an inclination value range.

In some embodiments, inclination value ranges are stored in memory as arrays of linear segments of values between 0 and 1 for increments of leaning values between 1 and 10. For example, in some implementations, an increment of 0.1 is used, and the inclination value range is represented within the system as an array of 100 values (e.g., collectively defining or representing a compressed version of a curve such as those shown in FIG. 5) with a header array that specifies the weightage and increment. A graphical representation of an example inclination value range, defined as {{5,0.1},{3,0.1,0.2,0.3,0.7,1.0,0.8,0.2,90}, has a unimodal distribution and is shown in FIG. 6. A further example inclination value range, having a bimodal distribution and defined as:

{{4,0.2 },{25,0.1,0.3,0.7,1.0,1.0,0.8,0.7,0.5,0.7,0.9,
0.8,0.3,0.2,0.1,11}} is shown in FIG. 7.

Given one or more inclination value ranges, such as those shown and discussed with reference to FIGS. 6 and 7, a compressed multidimensional data profile can include a collection of the one or more inclination value ranges (or a subset thereof), each associated with a distribution type, for example:

{{{5,0.1},{3,0.1,0.2,0.3,0.7,1.0,0.8,0.2,90}

{{4,0.2},{2,0.1,0.3,0.5,0.7,1.0,0.9,0.8,0.5,39}

{{2,0.1},{30,0.1,0.2,0.3,0.7,1.0,0.8,0.2,63}}

In some embodiments, the modification of inclination value ranges involves modifying an existing or previously-stored inclination value range based on a newly-received stimulus-response signal (or other evidence), for example by adding or removing the effects of the new stimulus-response signal to/from the existing or previously-stored inclination value range. In some embodiments, the received stimulus-response signal has the same structure or format as the inclination value range to be modified. Adding the effects of a stimulus-response signal is performed using a "(+)" operation (aggregation operation), and removing the effects of a stimulus-response signal is performed using a "(−)" operation (disaggregation operation).

In some implementations, a range of inclination values "RI" is defined as follows:

$RI=\{\{w_m,inc_m\},\{x_{m,i}\}$ for $i=1,10/inc_m\}$ where $w_m$=a weight of the plurality of weights, $inc_m$=increment, and $x_m$ is a value in a range of inclination values from the set of ranges of inclination values, and evidence data "E" (e.g., a digital representation of a stimulus-response pair) is defined as follows:

$E=\{\{w_E,inc_E\},\{x_{E,i}\}$ for $i=1,10/inc_E\}$ where $w_E$=weight, $inc_E$=increment, and $x_E$ is a value in the range of inclination values, all for E, and modifying RI based on E using a (+) operation is performed as follows:

$\{\{w_m+w_E,min(inc_m,inc_E)\},\{(w_m*x_{m,i}+w_E*x_{E,i})/(w_m+w_E)\}$ for $i=1,10/min(inc_E,inc_m)\}$.

A (−) operation, on the other hand, is performed as follows:

$\{\{w_m-w_E,min(inc_m,inc_E)\},\{(w_m*x_{E,i}-w_E*x_{E,i})/(w_m-w_E)\}$ for $i=1,10/min(inc_E,inc_m)\}$.

Figure 8A:
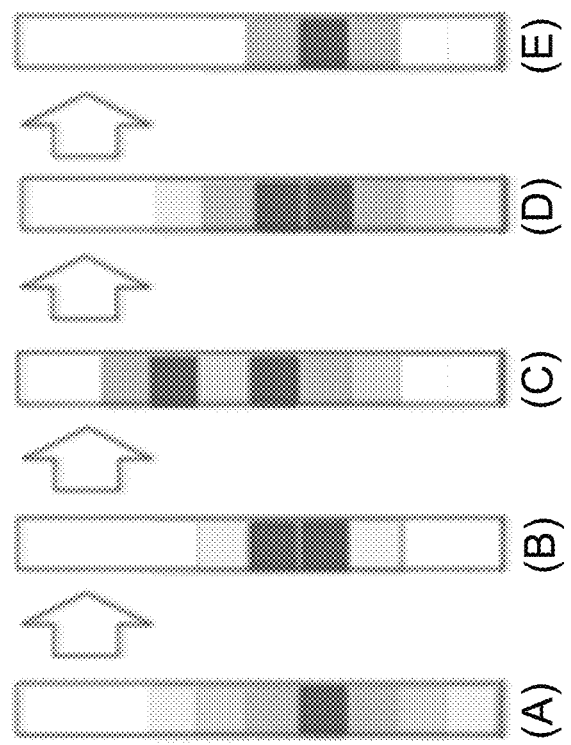
FIG. 8A illustrates an example of a time-varying inclination value ranges.
Figure 8B:
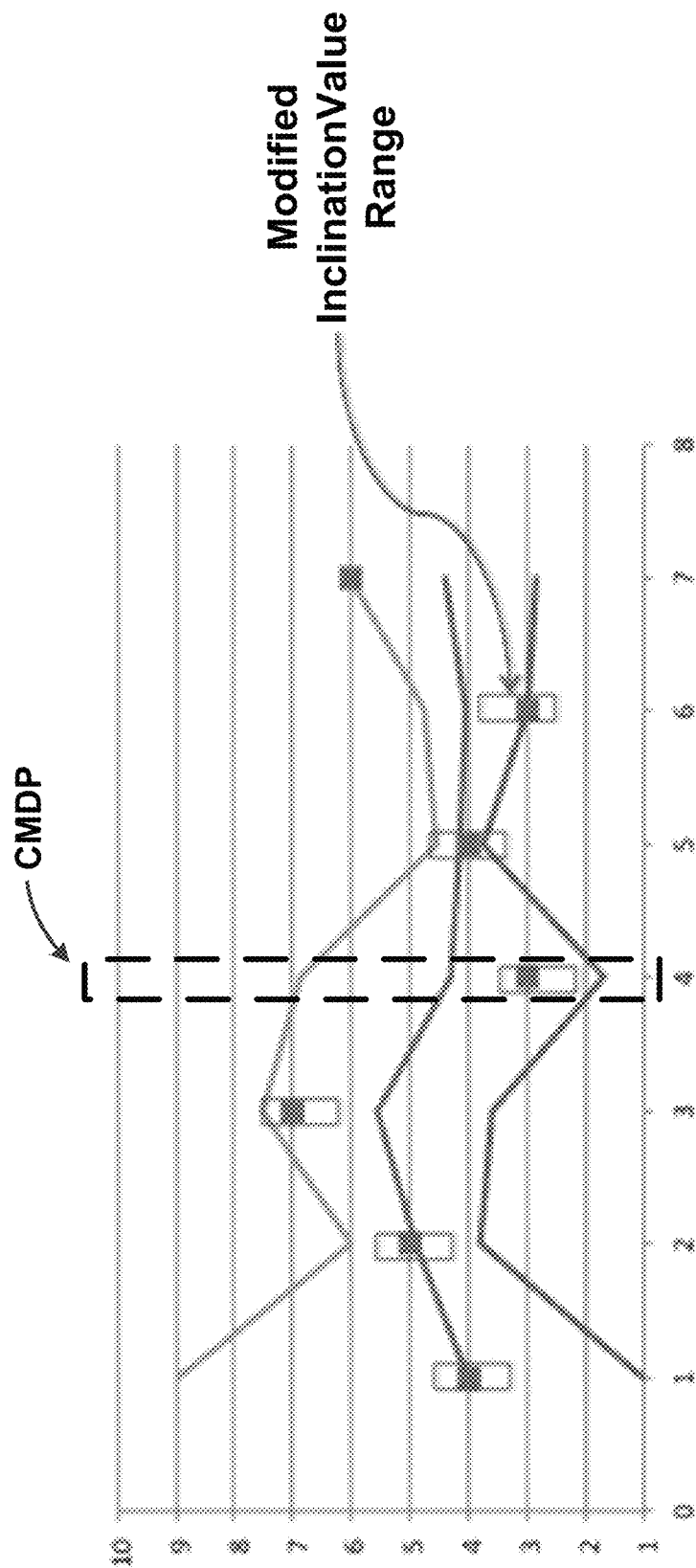
FIG. 8B is an example of a plot of three evolving inclination value ranges, which collectively can define a compressed multidimensional data profile.

FIG. 8A illustrates an example of a time-varying inclination value range. As shown in FIG. 8A, moving temporally from left to right, the graphical representation of the inclination value range changes from (A) an inclination value range having a first, broad, unimodal distribution and centered on a first value (or "peak") below a midpoint, to (B) an inclination value range having a second, unimodal distribution that is tighter/narrower than the first distribution and centered on a second value greater than the first value, to (C) an inclination value range having a third, bimodal distribution with peaks corresponding to third and fourth values that are greater than the first and second values, to (D), an inclination value range having a fourth, broad unimodal distribution similar to the first distribution but centered on the second value, to (E), an inclination value range having a fifth, unimodal distribution that is tighter/narrower than the first, second, third and fourth distributions and centered on the first value. The inclination value range shown to evolve in FIG. 8A can correspond to a single distribution type, and as such, reflects, for each time slice, only a portion of the composite compressed multidimensional data profile (which, itself, includes a set of inclination value ranges). FIG. 8B is an example of a plot of three evolving inclination value ranges (chronologically, from left to right), which collectively and at any given time, can define a compressed multidimensional data profile ("CMDP"), according to an embodiment. At each of time t=1 through t=7, a new stimulus-response signal (or other evidence) is received, and one or more associated inclination value ranges of the three inclination value ranges shown is modified in response to the stimulus-response signal, which in turn causes an update (or revision) to the CMDP at each relevant time period.

The compressed multidimensional data profiles (CMDPs) allow for a greater amount of data to be compressed and stored than would be the case without such compression. This compression allows for the translation processor (e.g., translation processor 103 in FIG. 1) to perform the processes described herein in a much more efficient manner. In addition, this compression allows for the system to scale much effectively, to process a greater amount of data, and to perform potentially more accurate and effective processes in that a greater amount of data allows for better feedback into the processes described herein, which can be updated based on the improved feedback.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate systems may be performed by the same system, and functionality illustrated to be performed by the same system may be performed by separate systems. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in multiple units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention claimed is:

1. A method, comprising:
receiving, at a processor, stimulus-response data including a digital representation of a stimulus and a digital representation of a response;
identifying, via the processor, a distribution type from a plurality of distribution types, based on the digital representation of the stimulus;
identifying, via the processor, a range of inclination values of the distribution type, based on the digital representation of the response; and
compiling, via the processor, a compressed multidimensional data profile associated with an object of the stimulus-response data, the compressed multidimensional data profile defined as:

$$M(I)=\{RI(DT1,I),RI(DT2,I),RI(DT3,I) \ldots RI(DTN,I)\}$$

where M=the compressed multidimensional data profile, I=an identifier of an individual, RI=the range of inclination values, and DT1 through DTN are the plurality of distribution types.

2. The method of claim 1, wherein the distribution type is a first distribution type, the range of inclination values is a first range of inclination values, the method further comprising:
identifying, via the processor, a second distribution type from the plurality of distribution types, based on the digital representation of the stimulus; and
identifying, via the processor, a second range of inclination values of the second distribution type, based on the digital representation of the response,
wherein compiling the compressed multidimensional data profile is based on the first distribution type, the second distribution type, the first range of inclination values and the second range of inclination values.

3. The method of claim 1, further comprising:
calculating, via the processor, a weight associated with the stimulus-response data, the calculating based on a rule, the rule being a function of a credibility of a source of the stimulus-response data,
the compiling the compressed multidimensional data profile being based on the weight.

4. The method of claim 1, wherein the stimulus-response data is a first stimulus-response data, the stimulus is a first stimulus, the response is a first response, the method further comprising:
receiving, via the processor, a second stimulus-response data including a digital representation of a second stimulus and a digital representation of a second response; and
modifying the compressed multidimensional data profile based on the second stimulus-response data.

5. The method of claim 1, wherein the range of inclination values has a multimodal distribution.

6. The method of claim 1, wherein:
the range of inclination values represents behavioral leanings of the individual; and
the compressed multidimensional data profile is associated with a mindset profile of the individual.

7. The method of claim 1, further comprising:
sending, to a compute device of the individual and after compiling the compressed multidimensional data profile, a signal representing a plurality of recommendations for the individual; and
receiving updated stimulus-response data after sending the signal representing the plurality of recommendations for the individual.

8. A method, comprising:
calculating, via a processor, a plurality of weights, each weight from the plurality of weights being uniquely associated with a stimulus-response pair from a plurality of stimulus-response pairs;
retrieving, via the processor, a plurality of distribution types, each distribution type from the plurality of distribution types being associated with a stimulus from a plurality of stimuli;
retrieving, via the processor, a plurality of ranges of inclination values, each range of inclination values from the plurality of ranges of inclination values being uniquely associated with a response from a plurality of responses and a distribution type from the plurality of distribution types; and
compiling, via the processor, a compressed multidimensional data profile based on the plurality of weights, the plurality of distribution types, and the plurality of ranges of inclination values, the compressed multidimensional data profile defined as:

$$M(I)=\{RI(DT1,I),RI(DT2,I),RI(DT3,I) \ldots RI(DTN,I)\}$$

where M=the compressed multidimensional data profile, I=an identifier of an individual, RI=a range of inclination values from the plurality of ranges of inclination values, and DT1 through DTN are the plurality of distribution types.

9. The method of claim 8, wherein the plurality of distribution types includes at least one distribution type of: a desire-to-improve type, a willingness-to-learn type, a judgment-style type, and a learning-style type.

10. The method of claim 8, wherein each range of inclination values from the plurality of ranges of inclination values includes an array of integer values between 0 and 1.

11. The method of claim 8, wherein:

$$RI=\{\{wm,incm\},\{xm,i\} \text{ for } i=1,10/incm\},$$

where wm=a weight from the plurality of weights, incm=increment, and xm is a value in a range of inclination values from the plurality of ranges of inclination values,
the method further comprising:
modifying RI based on evidence data (E), where:

$$E=\{\{wE,incE\},\{xE,i\} \text{ for } i=1,10/incE\},$$

where wE=an evidence weight, incE=increment, and xE is a value in the range of inclination values, all for E, and modifying RI based on E is as follows:

$$\{\{wm+wE, \min(incm, incE)\}, \{(wm*xm, i+wE*xE, i)/(wm+wE)\} \text{ for } i=1, 10/\min(incE, incm)\}; \quad (1)$$

or $$\{\{wm-wE, \min(incm, incE)\}, \{(wm*xE, i-wE*xE, i)/(wm-wE) \text{ for } i=1, 10/\min(incE, incm)\}. \quad (2)$$

12. The method of claim 8, wherein:
the plurality of ranges of inclination values represents behavioral leanings of the individual; and
the compressed multidimensional data profile is associated with a mindset profiles of the user.

13. The method of claim 8, further comprising:
sending, to a user interface and after compiling the compressed multidimensional data profile, a signal representing a plurality of recommendations for the individual; and
receiving an updated plurality of stimulus-response pairs after sending the signal representing the plurality of recommendations for the individual.

14. The method of claim 8, wherein at least one range of inclination values from the plurality of ranges of inclination values has a multimodal distribution.

15. The method of claim 8, wherein the calculating the plurality of weights is based on a credibility of a source of the plurality of stimulus-response pairs.

16. A method, comprising:
retrieving, via a processor, a plurality of distribution types, each distribution type from the plurality of distribution types being uniquely associated with a stimulus from a plurality of stimuli;
retrieving, via the processor, a plurality of ranges of inclination values, each range of inclination values from the plurality of ranges of inclination values being uniquely associated with a response from a plurality of responses and a distribution type from the plurality of distribution types; and
defining, via the processor, a compressed multidimensional data profile based on a plurality of weights, the plurality of distribution types, and the plurality of ranges of inclination values, the compressed multidimensional data profile being defined as:

$$M(I) = \{RI(DT1, I), RI(DT2, I), RI(DT3, I) \ldots RI(DTN, I)\}$$

where M=the compressed multidimensional data profile, I=an identifier of an individual, RI=a range of inclination values from the plurality of ranges of inclination values, and DT1 through DTN are the plurality of distribution types.

17. The method of claim 16, wherein:
the plurality of ranges of inclination values represents behavioral leanings of the individual; and
the compressed multidimensional data profile is associated with a mindset profile of the user.

18. The method of claim 16, further comprising:
sending, to a user interface and after defining the compressed multidimensional data profile, a signal representing a plurality of recommendations for the individual; and
receiving an updated plurality of stimulus-response pairs after sending the signal representing the plurality of recommendations for the individual.

19. The method of claim 16, wherein at least one range of inclination values from the plurality of ranges of inclination values has a multimodal distribution.

20. The method of claim 16, wherein the plurality of weights is associated with a credibility of a source of the plurality of responses.

\* \* \* \* \*